Nov. 19, 1940.  M. I. RAPPAPORT  2,222,301
METHOD AND APPARATUS FOR PRODUCING MULTIPLE REFLECTIONS
Filed Dec. 15, 1934
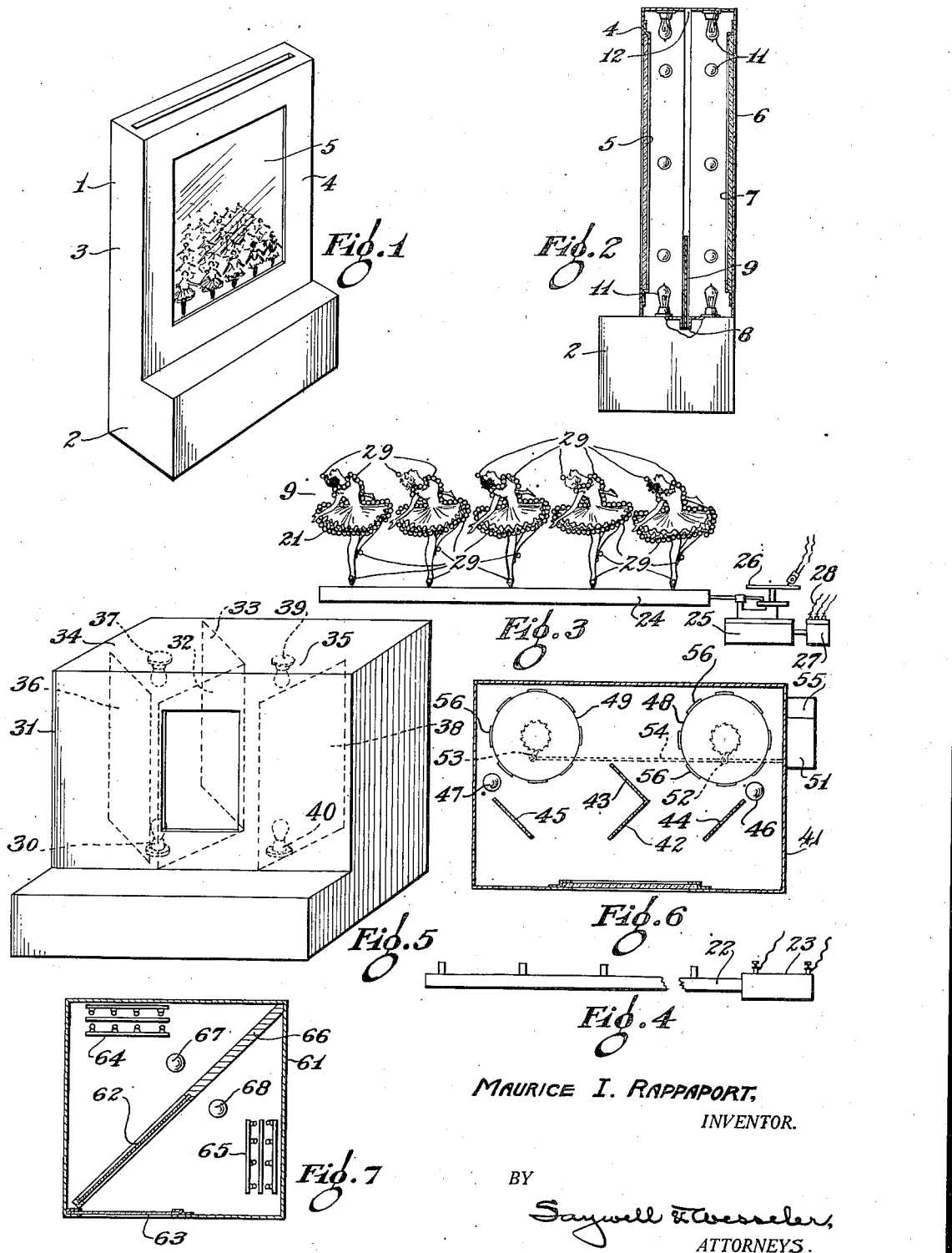
MAURICE I. RAPPAPORT,
INVENTOR.
BY
Saywell & Wesseler,
ATTORNEYS.

Patented Nov. 19, 1940

2,222,301

UNITED STATES PATENT OFFICE 2,222,301

METHOD AND APPARATUS FOR PRODUCING MULTIPLE REFLECTIONS

Maurice I. Rappaport, Cleveland Heights, Ohio

Application December 15, 1934, Serial No. 757,599

3 Claims. (Cl. 272—13)

This invention, as indicated, relates to a method and apparatus for producing multiple reflections. More particularly, it comprises a structure utilizing transparent and reflecting surfaces in conjunction with objects to be reflected, and means of illuminating the same so that to a person looking toward the field of view there appears not a single object, but a large massed presentation of images giving the effect of a limitless number of duplications.

The invention also comprises the method of utilizing transparent and reflecting surfaces and interchanging the functions of the same so that transformation and dissolving view effects may be brought about.

The invention also includes the method and apparatus for bringing about the effects just referred to and animating and variously moving the objects and the background thereof to the end that the reflections may present movement or special lighting and animated effects.

To the accomplishment of the foregoing and related ends, said invention, then, consists of the means and method hereinafter fully described and particularly pointed out in the claims, the annexed drawing and the following description setting forth in detail certain means and methods embodying the invention, such disclosed means and method constituting, however, but several of various forms in which the principle of the invention may be used.

In said annexed drawing:

Figure 1 is a perspective view of an apparatus embodying the principles of the invention;

Figure 2 is a central vertical sectional view of the structure shown in Figure 1;

Figure 3 is an enlarged detail view showing one strip of ballet girls and actuating mechanism;

Figure 4 is a fragmentary diagrammatic view showing an actuating bar with a solenoid for moving the same;

Figure 5 is a perspective view showing a modified form of apparatus embodying the principles of the invention;

Figure 6 is a top plan view of another form of apparatus embodying the principles of the invention; and Figure 7 is a top plan view of a still further form of apparatus embodying the principles of the invention.

As clearly shown in Figure 1 of the drawing, the device, when applied to a simple multiple reflection exhibitor, is preferably in the form of a cabinet 1, wherein a supporting base portion 2 carries a substantially rectangular enclosure or casing 3 formed with a front wall 4 to receive a transparent mirror 5 and formed with a back wall 6 to receive and support a true mirror 7 in spaced relation to the transparent mirror.

In the structure shown, the transparent mirror and the true mirror are spaced from each other a distance of approximately six inches. At the bottom of the casing a groove 8 is provided within which the object 9 to be reflected is inserted. Such groove is preferably centrally positioned, although to bring about spacing effects the object may be positioned closer to one of the mirrors than to the other.

Each of the frames 4 and 6 carries about its periphery a plurality of lighting units 11 which may be in the form of incandescent bulbs of suitable illuminating effect to give the desired brightness to the images. In the form illustrated, three such incandescent bulbs are provided along each of the side and top and bottom areas of each of the frames 4 and 6, so as to provide full and complete illumination for the object to be reflected and the images in the respective reflecting surfaces.

In order to place the object to be reflected in position, a slot 12 may be provided in the upper wall of the casing, or the front or back wall may be hinged to permit access to the interior of the cabinet to arrange the article or articles to be reflected.

With an apparatus constructed as above explained, a spectator standing in front of the transparent mirror 5 will note not a single article, such as the object 9 within the casing, but a multiple series of reflections of such article extending apparently into infinity.

While the object to be reflected, as shown in the drawing, comprises a cut-out strip of ballet or chorus girls, it is to be understood that any articles, whether transparent or opaque, whether in strip form or independent individual or series of articles, may be placed at a central point between the reflecting mirrors and identical effects of multiple reflection be obtained in this manner. Thus, should a row of bottles be placed along the central line between the reflecting mirrors on a platform below the horizontal line of vision of the observer, or supported above or to one side of the same, or in any position displaced from the central line of vision of the spectator, such object or objects will be seen as an infinite series of duplications due to the multiple reflections which the apparatus will bring about. Each of such individual articles may be separately illuminated or animated, if desired, or selected articles of a series may be so illuminated or animated.

Through the use of reflecting paints and iridescent and luminous surfaces, the duplication of the reflections may be carried on to better advantage, and but slight loss of illumination be involved in the distant reflections, and such loss as occurs tending to heighten the effect of reality.

If the transparent mirror is placed at a slight angle to the true mirror, a curve of the reflections in one direction or the other will be brought about, so that the vanishing point of the images will be moved to the right or left in accordance with the direction of displacement of one of the mirrors with respect to the other.

In addition to the angular displacement of one of the mirrors with reference to the other, the mirrors themselves may be provided with convex or concave surfaces, or concavo-convex surfaces, or other combinations of displaced reflecting areas, and such curved surfaces may extend in a vertical direction or in a horizontal or angular direction. Thus very unusual optical effects can be brought about, and distorted perspectives and exaggerated proportions can be introduced over the whole or part of the total series of multiple reflections, and also the mirrors may be oscillated.

Thus, where it is intended to produce a ballet or chorus, but a single line of ballet or chorus girls is required, such strip being preferably in the form of a cut-out strip 21 showing the images in positive on the forward side of the strip and in reverse on the rearward side of the strip, so that positive reflections are reproduced from the rearward face to correspond with the negative reflections transmitted from the transparent mirror to the true mirror from the forward face. In this manner, every other image will be a reproduction from the forward face of the strip, and every intermediate image will be a reproduction from the rearward face of the strip.

In addition to using the reflecting surfaces to reproduce objects which are at rest, the objects themselves may be animated or bodily shifted. This may be accomplished through mechanism such as the actuating bar 22 moved by means of an electro-magnet or solenoid 23, shown in Figure 4, or through the bar 24, shown in Figure 3, which may be actuated by a motor 25 which may be mechanically or electrically driven, and which may simultaneously drive a phonograph turntable 26 to produce sounds or music which, if desired, may be in synchronism with the motion of the figures. The effect of a singing or dancing chorus can be brought about by swaying the individual figures of the ballet or chorus girls, and the motions may be varied through a certain range before repeating themselves, through the use of a suitable series of cams to modify the various movements to be imparted to the figures. As has been indicated, a suitable synchronized sound control will serve to keep the motions in harmony with the music.

Likewise, through the use of suitable resistance and switching elements actuated by the motor 25 and positioned within the switch box 27 having suitable electrical connections 28, the lighting elements can be dimmed or brightened, and variously colored lighting effects can be introduced. The lighting can also be carried through to the strip of figures, so that the ballet or chorus may have the appearance of individually carrying lights 29 throughout the entire multitude of reflections.

In the form of construction shown in Figure 5, the viewing box 31 is provided with a transparent mirror 32 set at an angle in the central panel, and having a true mirror 33 set at a complementary angle thereto and joining the transparent mirror at its inner edge, and at either side has an enclosure 34, 35 which is concealed from the person viewing the apparatus wherein an illuminated specially constructed poster displaying means is concealed.

The enclosure 34 is preferably slotted to receive a poster 36, or other object to be exhibited, at an angle substantially parallel to that of the true mirror 33, and lighting elements 30, 37 serve to suitably illuminate the poster. The poster 36 may be of a size to compensate for distance.

The enclosure 35 is slotted to receive a poster 38 at an angle substantially parallel to the transparent mirror 32, and suitable lighting elements 39, 40 serve to illuminate the poster. If the posters are provided with printed matter, the same should be in reverse so that the observer can be provided with the proper image in the true mirror or transparent mirror when the exhibiting device is in use.

As has been indicated, such reflecting device is provided at both the right and left of the transparent mirror and the reflections are intended to occur alternately through the switching on and off of the lights adjacent the respective objects to be exhibited. By providing a rotating or other progressive shifting device for the matter to be displayed, the apparatus may be utilized to carry on automatically the presentation of a large series of successive reflections.

A device of this character is illustrated in Figure 6, wherein the casing 41 is provided with a transparent mirror 42 and a true mirror 43 in a position substantially similar to the mirrors described in connection with the case illustrated in Figure 5 with the mirrors 32, 33.

In place of the posters or like objects 36, 38, true mirrors 44, 45 are positioned in the apparatus with suitable lighting devices 46, 47 and rotating cylinders 48, 49 are provided angularly in front of the true mirrors 44, 45, respectively, and automatically rotate by means of a motor 51 intermittently shifting such cylinders through a ratchet mechanism 52, 53 carried on a bar 54 which is intermittently shifted by the mechanism associated with the motor 51. The motor 51 also drives the switching apparatus within the casing 55 so that the lights can be flashed on and off consistently with the movement of the exhibiting cylinders 48, 49. Each of the cylinders 48, 49 carries a plurality of posters 56 or other objects to be exhibited.

With a device arranged in a manner to reflect a single image to the transparent mirror, a transformation effect such as the dissolving of an apple into an orange, or vice versa, may be brought about with the apparatus, by placing one of such objects directly in the line of vision from the observer through the transparent mirror to a position spaced rearwardly of such mirror a distance equal to the distance of the second article within the concealed panel to the right or left of the transparent mirror. Then by cutting off the lights in one compartment and illuminating those in the other, the transformation of an apple into an orange, or vice versa, can be readily brought about. Such transformation can be worked with multiple reflections by placing suitable mirrors behind each of the articles to be reproduced at corresponding distances from the transparent mirror reflecting the images toward the observer.

In the form of apparatus shown in Figure 7, a transformation or dissolving view apparatus for multiple reflections is illustrated, wherein a casing 61 is provided having a transparent mirror 62 positioned along one of the diagonal vertical planes of the enclosure adjacent the viewing aperture 63. Directly in line with the viewing aperture, the multiple reflecting device 64 is provided, and at an equal distance from the transparent mirror at right angles to the position of the multiple reflecting device 64 a multiple reflecting device 65 is provided. A partition 66 serves to keep the two halves of the casing in light-proof relation to each other. Illuminating bulbs 67, 68 serve to illuminate the opposite sides of the transparent mirror alternatively so as to cause the multiple reflecting device 64 or the multiple reflecting device 65 to be visible in accordance with the control of the illumination.

The description of various specific embodiments of the invention is by no means intended to be exhaustive in character, and is merely illustrative of certain aspects of the invention set forth to bring out certain of the combinations of optical effects which may be utilized with the method and apparatus described. The invention lends itself to many further adaptations and combinations.

The apparatus may be used to produce multiple reflections which may be viewed directly, or photographs may be made of the multiple reflections. Where the objects are animated, moving pictures may be taken of the moving objects as reproduced in multiple reflection and the method of so reproducing photographically or projecting by means of a lantern, or otherwise, such animated multiple reflections is to be understood as being included in applicant's invention.

Other modes of applying the principle of my invention may be employed instead of those explained, change being made as regards the means and steps herein disclosed, provided the means stated by any of the following claims or the equivalent of such stated means be employed.

I therefore particularly point out and distinctly claim as my invention:

1. A method of bringing about optical effects involving multiple reflections, which comprises placing a separate independent object, with its rearward face corresponding to the forward face in reverse outline, to be reflected between a true mirror and a transparent mirror set in substantially opposite position to each other and said object being positioned at a point displaced from the direct central line of vision of the spectator in front of the transparent mirror, and providing light-transmitting members each visible at each side of said object without duplication and illuminating such object on its front and rearward sides so as to produce identical reflections of substantially equal illumination progressively in alternate series in the transparent and true mirrors.

2. A method of bringing about optical effects involving multiple reflections, which comprises placing a separate independent object, with its rearward face corresponding to the forward face in reverse outline, to be reflected between a true mirror and a transparent mirror set in substantially opposite position and at a slight transverse angle to each other and said object being positioned at a point displaced from the direct central line of vision of the spectator in front of the transparent mirror, illuminating such object internally over certain areas open at each side and also illuminating such object on its front and rearward sides so as to produce identical reflections of substantially equal illumination progressively in alternate series in the transparent and true mirrors, and moving the object being reflected so as to bring about predetermined animated effects.

3. An apparatus of the character described, having in combination a casing, a true mirror and a transparent mirror supported in parallel relation within said casing, an object to be reflected positioned at an intermediate point between said true and transparent mirrors, said object having on its reverse side a reproduction in reverse of the characteristics displayed on its forward side and having members with internal luminosity each visible on each side of the object without duplication, and means marginally placed around each of said mirrors and on opposite sides of said object for illuminating each side of the object to be reflected as well as the full areas of each of said mirrors.

MAURICE I. RAPPAPORT.